US010142466B1

(12) United States Patent
Kusnierz et al.

(10) Patent No.: US 10,142,466 B1
(45) Date of Patent: Nov. 27, 2018

(54) SYSTEMS AND METHODS FOR SPECIAL CALLED NUMBER CALL HANDLING

(71) Applicant: Sonus Networks, Inc., Westford, MA (US)

(72) Inventors: Frank Kusnierz, Pleasanton, CA (US); Rajiv Harish Patel, Newark, CA (US)

(73) Assignee: Sonus Networks, Inc., Westford, MA (US)

( * ) Notice: Subject to any disclaimer, the term of this patent is extended or adjusted under 35 U.S.C. 154(b) by 0 days.

(21) Appl. No.: 15/594,578

(22) Filed: May 13, 2017

Related U.S. Application Data

(60) Provisional application No. 62/336,130, filed on May 13, 2016.

(51) Int. Cl.

| | |
|---|---|
| ***H04M 3/42*** | (2006.01) |
| ***H04M 7/06*** | (2006.01) |
| ***H04W 4/90*** | (2018.01) |
| *H04W 84/04* | (2009.01) |
| *H04M 7/00* | (2006.01) |
| *H04L 29/06* | (2006.01) |

(52) U.S. Cl.
CPC ......... *H04M 3/42187* (2013.01); *H04M 7/06* (2013.01); *H04W 4/90* (2018.02); *H04L 63/0853* (2013.01); *H04M 7/0084* (2013.01); *H04M 2242/04* (2013.01); *H04W 84/042* (2013.01)

(58) Field of Classification Search
CPC ........................... H04M 3/42187; G06F 11/00
See application file for complete search history.

(56) References Cited

U.S. PATENT DOCUMENTS

2006/0072575 A1* 4/2006 Miyajima ......... H04L 29/06027 370/392
2008/0220813 A1* 9/2008 Brown ................ H04L 12/5692 455/552.1
2013/0051213 A1* 2/2013 Kaushal .............. H04L 65/1066 370/216

FOREIGN PATENT DOCUMENTS

FR 2977444 * 6/2011 ......... H04L 65/1036

* cited by examiner

*Primary Examiner* — Myron K Wyche
(74) *Attorney, Agent, or Firm* — Straub & Straub; Stephen T. Straub; Michael P. Straub

(57) ABSTRACT

Systems and methods which provide enhanced call handling for special called numbers, such as emergency dispatch numbers, are disclosed. An enhanced call handling application of embodiments monitors a native calling application to determine if a call attempt has been made with respect to a number for which enhanced call handling is provided and makes one or more determinations with respect to the success of the attempt. When it is determined that the call attempt was not successful or may not have otherwise been satisfactory to the user, the enhanced call handling application of embodiments operates to facilitate initiating the call via an alternative network, such as by prompting the user regarding initiating the call via the alternative network or by autonomously initiating the call via the alternative network.

20 Claims, 8 Drawing Sheets

SYSTEMS AND METHODS FOR SPECIAL CALLED NUMBER CALL HANDLING

RELATED APPLICATION

The present application claims the benefit of U.S. Provisional Patent Application Ser. No. 62/336,130 filed on May 13, 2016 which is hereby expressly incorporated by reference in its entirety.

TECHNICAL FIELD

The invention relates generally to telecommunications and, more particularly, to enhanced call handling for special called numbers, such as emergency dispatch numbers.

BACKGROUND OF THE INVENTION

The use of cellular communications devices (often referred to as user equipment (UE)), including devices of varying capabilities from basic wireless telephony (often referred to as wireless or cellular telephones) to advanced capabilities including computing, personal digital assistant (PDA), data communication, etc. in addition to wireless telephony (often referred to as smartphones), has become nearly ubiquitous. Many such UEs include multiple radio interfaces, such as a cellular network radio interface for facilitating wireless telephony communications and an Internet protocol (IP) network interface for facilitating wireless data communications.

Although perhaps not originally developed for providing voice communication, UE IP network interfaces are commonly utilized for providing voice calls (often referred to as voice over IP (VoIP) calls). For example, alternative calling applications may be installed on a smartphone configuration of a UE to provide an IP call interface whereby the user of the UE may initiate and/or answer calls using an IP network, when available, in a manner similar to a traditional cellular call interface. Instead of the UE wireless leg of the call being placed over the cellular wireless network, the call is placed over the wireless IP network, such as using a WiFi wireless local area network (WLAN) link established by the UE IP network radio interface. The VoIP call, although utilizing a wireless IP link, will be routed via the IP network to the core telecommunications network using a gateway coupling the core telecommunications and IP networks, and thus is operable to terminate the call with various termination points in the telephony network. Such VoIP calling applications may be particularly desirable for providing calling services without incurring over-the-air charges often associated with cellular calls, to avoid long distance or international calling charges for the call, etc.

There are, however, a number of differences with respect to the implementation and use of such VoIP calling. For example, the operating system of the UEs is typically configured to prevent redirection of calls placed to certain emergency dispatch numbers from the cellular network to another network. Certain emergency dispatch numbers, such as 911, are generally specifically identified in some way, such as by being stored in a particular memory location (e.g., a register of the UE subscriber identity module (SIM) and/or within the native cellular calling application), and when any such number is dialed using the native cellular calling application the call is prevented from being intercepted or directed to a different interface by the operating system and/or the native calling application. Moreover, additional processing typically provided with respect to other telephone numbers, such as creation of a call log record for the call and preventing outbound dialing of the number when the UE is locked, is not performed with respect to the aforementioned identified emergency dispatch numbers.

The operation of the native calling application may be adapted to facilitate completing a call to the identified emergency dispatch number(s), such as by allowing outbound dialing of the identified emergency dispatch number when the UE is locked and/or using any cellular network available to the UE for initiating a call to an identified emergency dispatch number (i.e., not restricting the call to the use of a cellular network to which the user has subscribed). A call attempted to be placed to one of the aforementioned identified emergency dispatch numbers may nevertheless fail to complete. For example, there may be no cellular networks, whether one for which the user has subscribed or otherwise, and thus despite the native calling application searching for any cellular network none may be found. Similarly, the cellular coverage may be of such poor quality that although the native calling application may initially establish a call, the call may nevertheless be dropped before all or sufficient information regarding the emergency is communicated. However, even in situations where the UE IP network radio interface provides a reliable communication link, the operating system and/or native calling application operates to prevent the call to the identified emergency dispatch number from being intercepted and completed using the IP network.

BRIEF SUMMARY OF THE INVENTION

The present invention is directed to systems and methods which provide enhanced call handling for special called numbers, such as emergency dispatch numbers. Embodiments provide an alternative calling application adapted to provide enhanced call handling for special called numbers (referred to herein as an enhanced call handling application). In operation according to embodiments, an enhanced call handling application monitors a native calling application to determine if a call attempt has been made with respect to a number for which enhanced call handling is provided, such as an attempt to establish a call to a particular dialed number via a cellular network by the native calling application. For example, the enhanced call handling application may monitor for a call attempt with respect to an identified emergency dispatch number, such as 911 in the United States and/or 112 in Europe. Although the number may comprise one for which the native calling application and/or operating system of the UE may prevent interception of the call by an alternative calling application, embodiments of the enhanced call handling application may nevertheless operate to facilitate placing of the call, such as via an alternative network (e.g., IP network). For example, the enhanced call handling application may present the user with a dialog box, message, or other means by which the user may elect to initiate the call using the enhanced call handling application and alternative network. Alternatively, the enhanced call handling application may autonomously initiate the call via the alternative network, such as under certain predetermined circumstances.

Embodiments of an enhanced call handling application adapted to provide enhanced call handling for special called numbers in accordance with the concepts herein include logic for determining when enhanced call handling is to be initiated. For example, logic of an enhanced call handling application operates to not only monitor for an attempt to initiate a call to one or more special called numbers (e.g., the aforementioned identified emergency dispatch numbers), but also operates to make one or more determinations with respect to the success of the attempt. It should be appreciated that operation of a typical UE configuration does not provide reporting, such as to alternative calling applications, with respect to the state or status of calls made to identified emergency dispatch numbers, nor provides information such as call logs from which such information may be readily obtained. Accordingly, embodiments of an enhanced call handling application monitors various aspects (e.g., cellular network connection status, cellular network connection quality, length of time between off-hook and on-hook for the call attempt, etc.) from which a determination may be made as to whether the call attempt was successful or otherwise satisfactory to the user. When it is determined that the call attempt was not successful or may not have otherwise been satisfactory to the user, the enhanced call handling application of embodiments operates to facilitate initiating the call via an alternative network (e.g., by prompting the user regarding initiating the call via the alternative network or by autonomously initiating the call via the alternative network).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
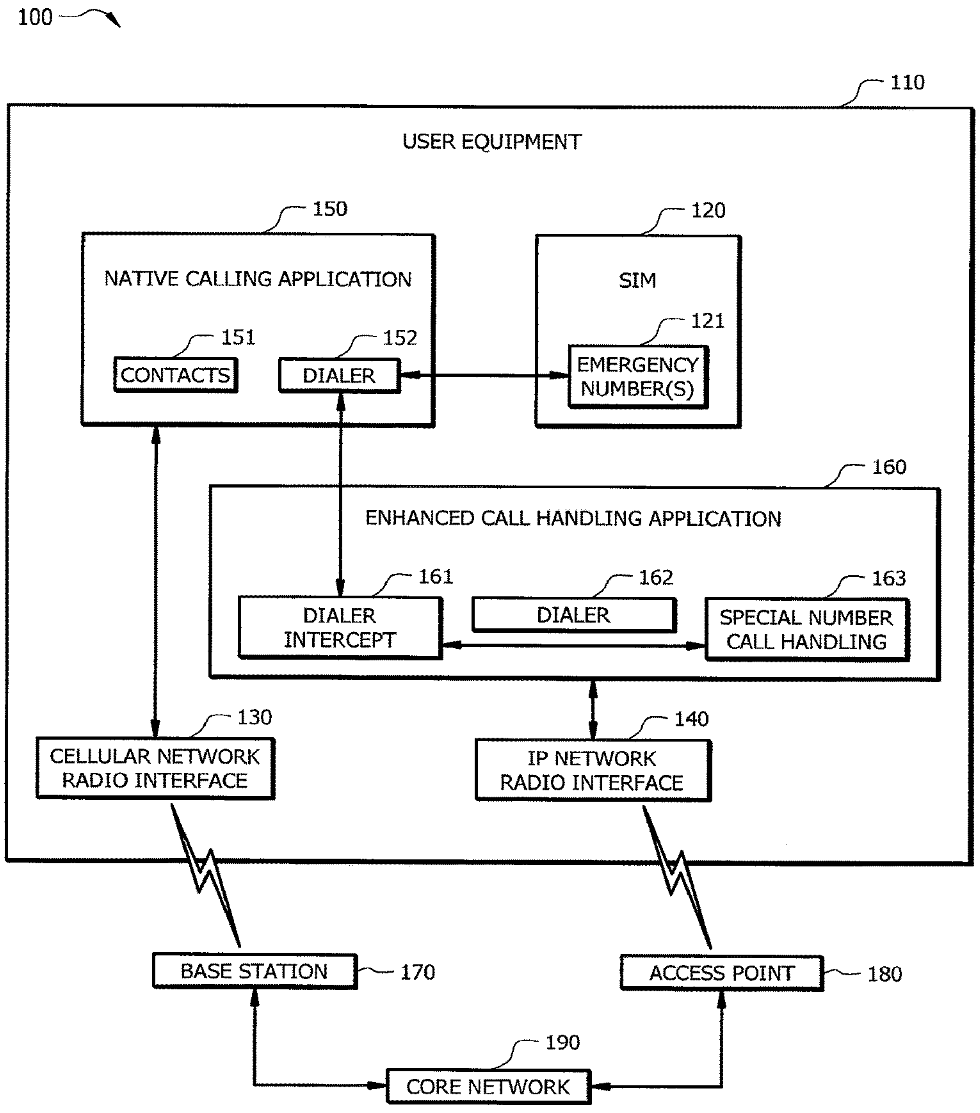
FIG. 1 shows a system adapted according to embodiments of the present invention.

FIG. 1 shows communication system 100 in which various devices may utilize wireless communication links in providing communication via a core network. One such device is shown as UE 110 which may comprise any of various device configurations, such as a personal computer, a smart phone, a personal digital assistant (PDA), a tablet device, etc. Although UE 110 may be provided in many such configurations, embodiments will be described herein with reference to a smart phone configuration of UE 110 to provide an example to aid in understanding the concepts herein.

Irrespective of the particular configuration of UE 110, UE 110 of embodiments comprises a processor-based system operable under control of one or more instruction set (e.g., software, firmware, applet, etc.) adapted to provide various communications operations, such as may include voice communications, multimedia communications, and data communications. Such processor-based systems may comprise a central processing unit (CPU) (e.g., a processor from the PENTIUM or CORE line of processors available from Intel Corporation, a processor from the CORTEX line of processors available from ARM Ltd., a processor from the SNAPDRAGON line of processors available from Qualcomm Incorporated, etc.), memory (e.g., random access memory (RAM), read only memory (ROM), flash memory, disk memory, optical memory, etc.) storing the aforementioned one or more instruction set and/or other data used herein. For example, UE 110 of the illustrated embodiment is shown as including SIM 120 storing emergency number(s) 121. Additionally, such processor-based systems may comprise appropriate input/output circuitry and devices (e.g., radio interface, network interface card (NIC), keyboard, digital pointer, display screen, touch screen, peripheral interface, microphone, speaker, wireless interface, etc.). For example, UE 110 is shown as including cellular network radio interface 130 and IP network radio interface 140.

UE 110 of the illustrated embodiment comprises native calling application 150 operable to provide communication services using cellular network radio interface 130. For example, in an embodiment where UE 110 comprises a cellular handset (e.g., smart phone), native calling application 150 may comprise an instruction set operable upon the processor-based platform of the device to provide telephony type wireless calling services, whereby cellular network radio interface 130 establishes a wireless link with a basestation (shown here as basestation 170) of the cellular network to facilitate a connection to one or more terminal devices via core network 190. Various functional blocks of native calling application 150 may operate to provide the aforementioned wireless telephony calling services, or some portion thereof. For example, dialer 152 may provide an interface by which a user may control initiation and termination of wireless telephony calls, such as using information (e.g., telephone numbers) stored in contacts 151 and/or emergency number(s) 121. Core network 190 may, for example, comprise a mobile core network, the public switched telephone network (PSTN), or other communication network in which communication links are established, maintained, monitored, and/or torn down with respect to a number of terminal devices for which communications services are provided. For example, core network 190 may comprise some portion of a mobile operator's cellular network, including the infrastructure, data, and control systems well known for providing such operation.

It should be appreciated, however, that the illustrated embodiment of UE 110 includes multiple radio interfaces. In particular, in addition to cellular network radio interface 130, UE 110 includes IP network radio interface 140. For example, IP network radio interface 140 may have been provided to facilitate data communication, such as through the use of a web browser and/or other data communication application (not shown).

An alternative calling application may be utilized with respect to UE 110 to provide an IP call interface whereby the user of the UE may initiate and/or answer calls using an IP network, when available, in a manner similar to the call interface provided by native calling application 150. For example, various functional blocks of enhanced call handling application 160 may operate to provide an alternative calling application, or some portion thereof, facilitating wireless telephony calling services via the IP network. Dialer 162 may, for example, provide an interface by which a user may control initiation and termination of wireless telephony calls, such as using information (e.g., telephone numbers) stored in contacts 151, emergency number(s) 121, and/or a contacts database (not shown) of enhanced call handling application 160. Additionally or alternatively, dialer intercept 161 may provide a process by which operation of dialer 152 is monitored for attempts to initiate wireless telephony calls via the cellular network radio interface for intercepting the calls and initiating the intercepted calls via the IP network. Accordingly, enhanced call handling application 160 of embodiments may operate to provide alternative calling operation, whereby instead of the UE wireless leg of the call being placed over the cellular wireless network, the call is placed over the wireless IP network, such as using a WiFi WLAN link established by IP network radio interface 140 with access point 180 (e.g., as may be coupled to the Internet or other IP network providing links facilitating a connection to core network 190). Such a VoIP call, although utilizing a wireless IP link, may be routed via the IP network to core network 190 using a gateway coupling the core telecommunications and IP networks, and thus is operable to facilitate a connection to one or more terminal devices via core network 190.

It should be appreciated that, although various functional blocks relevant to the disclosure herein have been shown with respect to the illustrated embodiments of native calling application 150 and enhanced call handling application 160, such applications may comprise additional or alternative functional blocks within the scope of the concepts herein. For example, native calling application 150 and/or enhanced call handling application 160 may comprise functional blocks for providing communications in addition to or in the alternative to voice communications, such as a short message service (SMS) functional block operable to provide text messaging services. Similarly, native calling application 150 and/or enhanced call handling application 160 may comprise functional blocks for providing call logging, call accounting, etc. Any or all such functional blocks of embodiments may be implemented at least partially in software (as one or more instruction sets) adapted for execution by a processor of the processor-based system. When implemented in software, elements of embodiments of the present invention are essentially code segments operable upon the processor. Such program or code segments can be stored in a computer readable medium, such as RAM, ROM, a storage device, etc. Additionally or alternatively, the code segments may be downloaded via one or more networks, such as a cellular or data network.

Enhanced call handling application 160 of embodiments is adapted to provide enhanced call handling for special called numbers, such as emergency dispatch numbers. Accordingly, enhanced call handling application 160 of the illustrated embodiment comprises special number call handling 163 operable to provide enhanced call handling functionality. Operation to provide enhanced call handling functionality in accordance with embodiments of the invention is represented in the flow diagram of FIG. 2.

Figure 2:
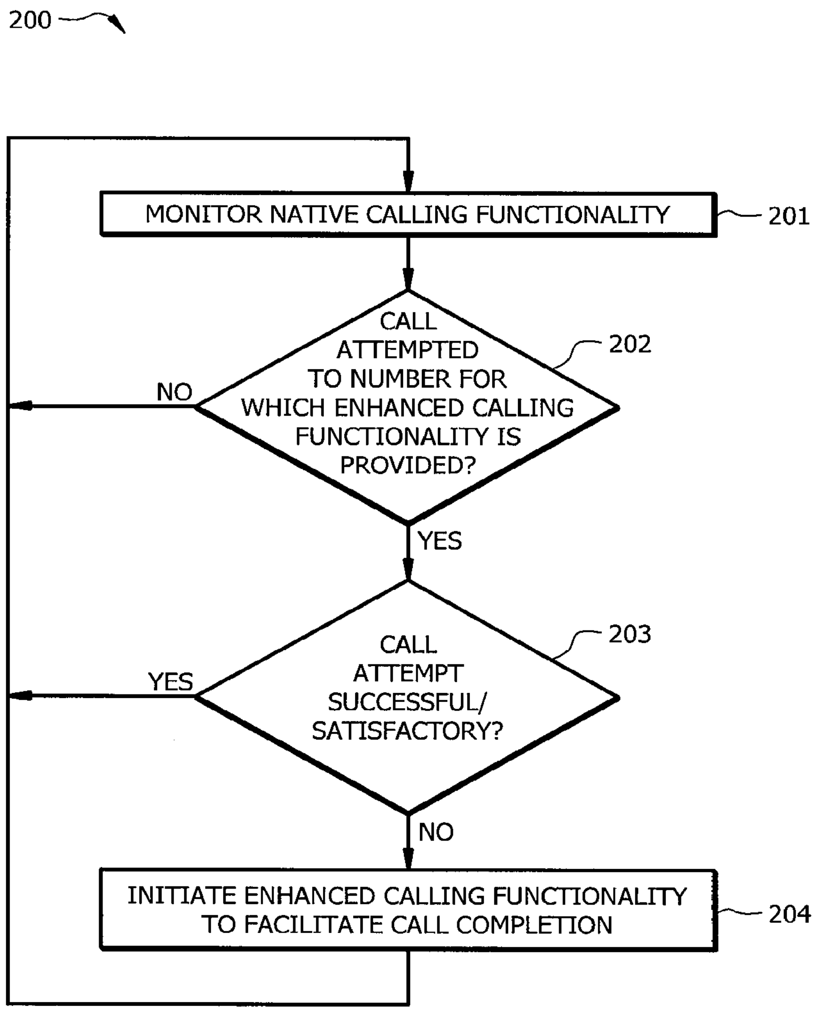
FIG. 2 shows a high level flow diagram of operation in accordance with embodiments of the present invention.

In operation according to flow 200 of FIG. 2, enhanced call handling application 160 monitors native calling application 150 to determine if an attempt has been made to establish a call to a particular dialed number, for which enhanced call handling is provided, via cellular network interface 130 at block 201. For example, dialer intercept 161 may monitor call attempts initiated by dialer 152 and pass relevant information (e.g., dialed number, information indicating a call attempt has been initiated, a time of the call initiation attempt, etc.) to special number call handling 163 for use with respect to enhanced call handling.

At block 202 of the illustrated embodiment, a determination is made as to whether the call attempt is with respect to a number for which enhanced calling functionality is provided. For example, special number call handling 163 may comprise (or be in communication with) a database of one or more numbers for which enhanced call handling is to be provided. Accordingly, logic of special number call handling 163 may compare the number to which the call attempt is being made to one or more numbers for which enhanced call handling is to be provided in order to determine if the call attempt is being made to a number for which enhanced calling functionality is provided. If it is determined that the call attempt is not with respect to a number for which enhanced calling functionality is provided, processing according to the illustrated embodiment returns to block 201 for continued monitoring of the native calling functionality. However, if it is determined that the call attempt is with respect to a number for which enhanced calling functionality is provided, processing according to the illustrated embodiment proceeds to block 203 for further enhanced call handling operation.

In operation of block 203 of embodiments, a determination is made as to whether the call attempted to the number for which enhanced calling functionality is provided was successful or otherwise satisfactory. For example, logic of special number call handling 163 may analyze information associated with the call, the call attempt, the state of the device, the state of one or more functional blocks of the device, etc. (e.g., information provided by dialer intercept 161 and/or other available information, such as from cellular network radio interface 130) to determine if the call attempt was successful or satisfactory (e.g., the call completed and adequate communications facilitated thereby). In operation according to embodiments, the aforementioned logic of special number call handling 163 may analyze information available from cellular network radio interface 130 to determine if connectivity to the cellular network was available and/or maintained during the call attempt by UE 110. Additionally or alternatively, the logic of special number call handling 163 may analyze information regarding the quality of the cellular connectivity to determine if sufficient connection quality was available and/or maintained during the call attempt by UE 110 to support desired or acceptable communications (e.g., connection quality less than a predetermined threshold quality level). The logic of special number call handling 163 may additionally or alternatively analyze information regarding the call attempt itself, such as to analyze a time of the call attempt going off-hook and the call attempt going back on-hook to determine that the call attempt duration was of insufficient elapsed time (e.g., call attempt duration less than a predetermined threshold time duration) to have likely facilitated desired or acceptable communications. Information analyzed by logic of special number call handling 163 may comprise information that is not directly related to the attempted call. For example, logic of special number call handling 163 of embodiments operates to determine if suitable connectivity (e.g., a communication link is established and maintained, connection quality provided is greater than a predetermined threshold quality level, etc.) to an alternative network (e.g., an IP network via IP network radio interface 140) is available for use by UE 110. It should be appreciated that various combinations of information may be analyzed according to embodiments of enhanced call handling application 160, such as to determine that the connection quality provided by the cellular network was poor during the call attempt, that the call attempt duration was relatively short to thereby determine that the call attempt was not completed satisfactorily, and that suitable connectivity is provided with respect to an alternative network.

Analysis with respect to the call attempt by special number call handling 163 at block 203 of the illustrated embodiment of flow 200 provides operation for determining when enhanced call handling is to be initiated. Accordingly, logic of enhanced call handling application 160 of the illustrated embodiment operates to not only monitor for an attempt to initiate a call to one or more special called numbers (e.g., the aforementioned identified emergency dispatch numbers), but also operates to make one or more determinations with respect to the success of the attempt in order to determine if further operation is to be provided to facilitate call completion. If it is determined at block 203 that the call attempt to the number for which enhanced calling functionality is provided was successful or otherwise satisfactory, processing according to the illustrated embodiment returns to block 201 for further monitoring of the native calling functionality without providing processing to further facilitate the call attempt (i.e., it has been determined that the call attempt was likely successful and thus further attempts at completing the call are unnecessary or undesired). However, if it is determined at block 203 that the call attempt to the number for which enhanced calling functionality is provided was not successful or may not have otherwise been satisfactory to the user, processing according to the illustrated embodiment proceeds to block 204 to facilitate initiating the attempted call via an alternative network.

At block 204 of embodiments, enhanced call handling application 160 initiates enhanced calling functionality with respect to the call attempt. For example, special number call handling 163 may control dialer intercept 161 and/or dialer 162 to initiate a call to the number of the call previously attempted using cellular network radio interface 130 to instead attempt the call using IP network radio interface 140. Operation to initiate enhanced calling functionality with respect to the call attempt provided by embodiments of enhanced call handling application 160 includes autonomously initiating the call via the alternative network (e.g., when it is determined that a call attempt has been made to a number for which enhanced call processing is to be provided and that the call attempt was not successful or otherwise satisfactory, a call to that number is initiated using the alternative network without further interaction by the user). Embodiments of enhanced call handling application 160, however, operate to at least inform the user regarding initiating enhanced calling functionality for the call attempt. For example, special number call handling 163 may control a user interface of UE 110 to display a dialog box and/or other message to indicate to the user that enhanced call handling operation is being initiated by enhanced call handling application 160. Embodiments of enhanced call handling application 160 may operate to autonomously initiate the call via the alternative network after display of the foregoing user notification, perhaps after a delay of several seconds to allow the user to terminate (opt-out) the alternative network call attempt. Some embodiments of enhanced call handling application 160 may, however, solicit user input regarding initiating the call via the alternative network. For example, the aforementioned notification to the user may include a user interface (e.g., soft button or other selection means) for use by the user in selecting to proceed with or to terminate the alternative network call attempt. Such solicitation of user input regarding initiating the call via the alternative network may, for example, be desirable to confirm the determination that the call attempt was not successful or satisfactory was accurate, to avoid cascading call attempts from a call originally initiated accidentally, to satisfy requirements that calls placed to certain emergency dispatch numbers be placed by a user, etc. It should be appreciated that the aforementioned user notification may be customized for a particular operator, user, device platform, region or country of operation, etc., such as to provide notification design, text, language, and/or graphics to comply with user, carrier, regulatory, and/or legal requirements.

The aforementioned notification to the user may be made in various forms, such as a popup dialog box, a banner message, a status icon in a tool tray, an audio alert, etc. Embodiments wherein enhanced call handling application 160 is operating as an alternative calling application monitoring calling functionality of a native calling application may, for example, implement a popup dialog box (perhaps with one or more soft buttons for soliciting user input). It should be appreciated, however, that certain calls (e.g., calls placed to identified emergency dispatch numbers) may be initiated by a native calling application when the device is otherwise locked (e.g., emergency calling from a lock screen of a smartphone). In such situations, embodiments of the invention may provide the aforementioned notification in the form of a banner notification operable to facilitate the user unlocking the device for enhanced call handling operation (e.g., the user selects and slides the banner notification to initiate device unlock operation and thereafter the enhanced call handling application operates as described herein).

Operation provided at block 204 of embodiments may facilitate action in addition to or in the alternative to initiating a call attempt using an alternative network. For example, some UE configurations (e.g., ANDROID 5 smartphones) operate to endlessly attempt calls to identified emergency dispatch numbers (i.e., continually search for cellular service without going back on-hook until the call attempt is manually terminated by the user). Accordingly, a determination that the call attempt is unsuccessful or otherwise unsatisfactory at block 203 of embodiments may determine that the call attempt is failing (e.g., determine that cellular service is not available and that the call attempt has not terminated within a predetermined threshold amount of time) despite the call attempt being ongoing. Enhanced calling functionality initiated at block 204 may utilize this information to facilitate call completion, such as by providing a notification to the user including a solicitation to allow the user to terminate the call attempt being made using the cellular network and thereafter attempting the call using an alternative network.

Figure 3B:
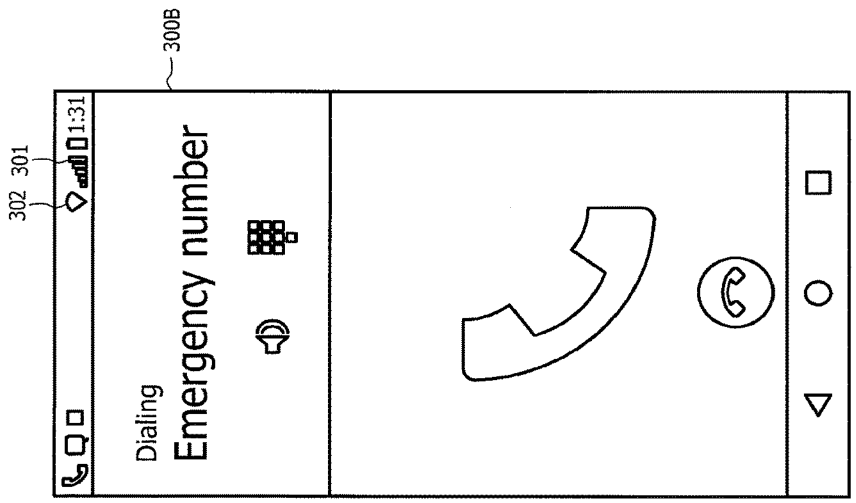
FIG. 3B shows an exemplary user interface screen presented in accordance with operation of embodiments of the present invention.
Figure 3A:
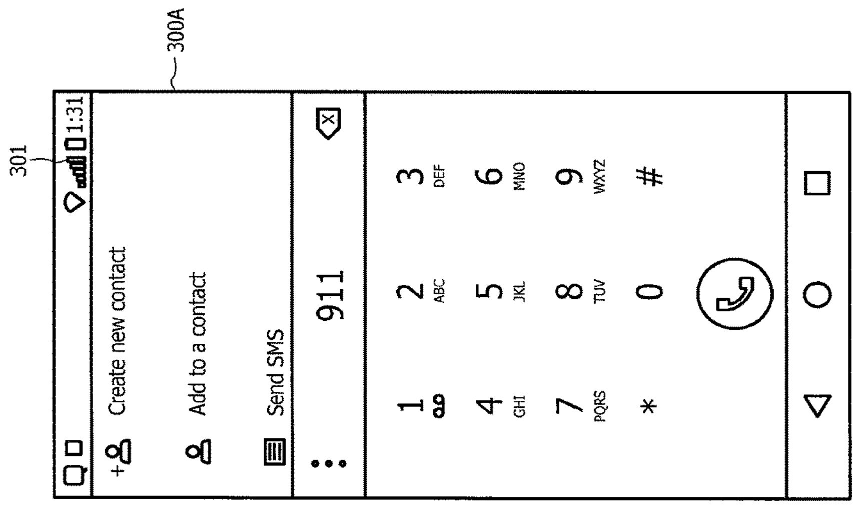
FIG. 3A shows an exemplary user interface screen presented in accordance with operation of embodiments of the present invention.
Figure 3D:
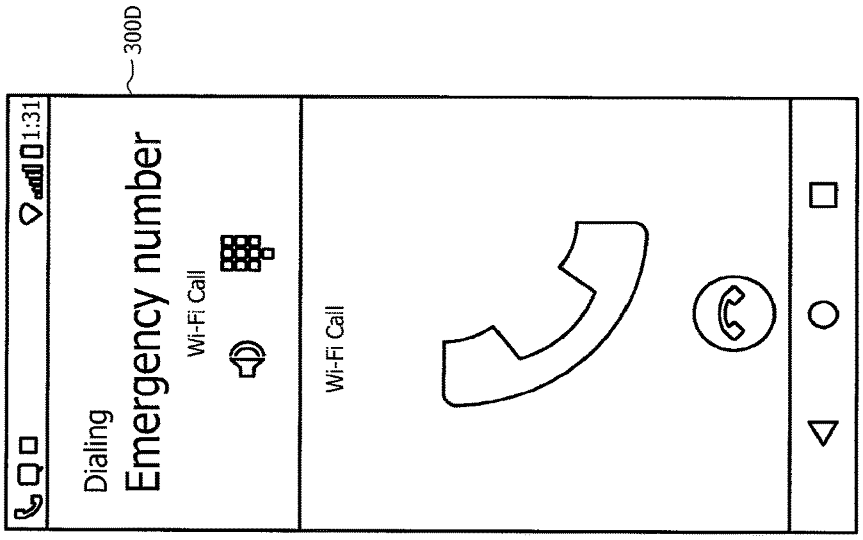
FIG. 3D shows a user interface screen presented in accordance with operation of embodiments of the present invention.
Figure 3C:
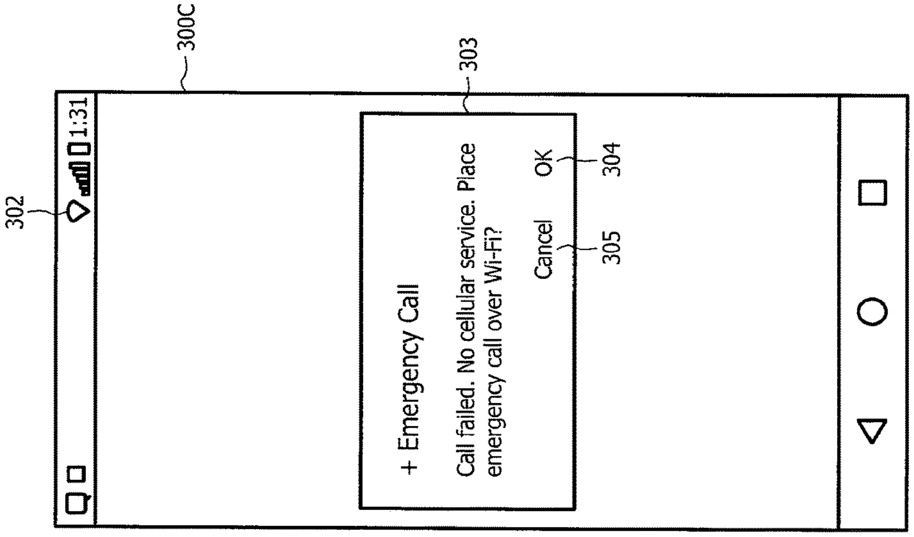
FIG. 3C shows a user interface screen presented in accordance with operation of embodiments of the present invention.

Operation of an exemplary embodiment in accordance with flow 200 of FIG. 2 is shown by the user interface screens of FIGS. 3A-3D. In particular, screen 300A of FIG. 3A shows a user of UE 110 has initiated an emergency dispatch call using native calling application 150. Enhanced call handling application 160 operates to monitor this calling functionality (block 201 of FIG. 2). Accordingly, logic of enhanced call handling application 160 may make a determination that a number for which enhanced calling functionality is provided (block 202 of FIG. 2), such as by comparing the number dialed to a database of numbers for which enhanced call handling is to be provided. However, as can be seen by cellular network signal strength indicator 301, UE 110 is not in cellular service. Thus, as shown by screen 300B of FIG. 3B, the call to the emergency dispatch number is terminated, such as by logic of native calling application 150 implementing a timeout on the call attempt, by the user determining that the call is not completing and manually terminating the call attempt, etc. As enhanced call handling application 160 is operable to monitor this calling functionality, logic of enhanced call handling application 160 may make a determination that the call attempt to the number for which enhanced call handling is to be provided was not successful (block 203 of FIG. 2). However, UE 110 is in service of an alternative network (e.g., WiFi IP network), as shown by WiFi network signal strength indicator 302. Accordingly, enhanced call handling application 160 of the illustrated embodiment causes UE 110 to display dialog box 303 to indicate to the user that enhanced call handling operation is initiated by enhanced call handling application 160 and that the call may be attempted using an alternative network (block 204 of FIG. 2), as shown in screen 300C of FIG. 3C. In the illustrated embodiment of dialog box 303, user input regarding initiating the call via the alternative network is solicited, whereby the user may elect to attempt the call using the alternative network by manipulating soft button 304 or cancel further enhanced call handling by manipulating soft button 305. In the case that the user elects to make the call attempt using the alternative network, enhanced call handling application 160 operates to initiate a call using the alternative network (e.g., a VoIP call using IP network radio interface 140), as shown by screen 300D of FIG. 3D.

Numbers for which the foregoing enhanced call handling is provided may include any number that further processing is desired to facilitate call completion or for which enhanced calling functionality is otherwise desired. In operation according to embodiments, the one or more numbers for which enhanced call handling is provided includes an identified emergency dispatch number, such as 911 in the United States and/or 112 in Europe. Additionally or alternatively, a service provider, user, or other entity (e.g., governmental entity) may identify one or more supplemental numbers for which enhanced call handling is to be provided. Any or all such supplemental numbers may be stored in a database of, or otherwise available to, special number call handling 163 for use in enhanced call handling. Such supplemental numbers may include emergency dispatch numbers, non-emergency dispatch numbers (e.g., 311 non-emergency number utilized in the United States), numbers not associated with emergency dispatch (e.g., 411 information number utilized in the United States, any number selected by a user, etc.), as well as combinations thereof.

It should be appreciated, however, that the above mentioned identified emergency dispatch numbers are often protected by the device operating system and/or native calling application from call interception by an alternative calling application or other third party application. Moreover, operation of native calling application 150 and/or the operating system of UE 110 does not provide reporting with respect to the state or status of calls made to identified emergency dispatch numbers, nor provides information such as call logs from which such information may be readily obtained. Accordingly, embodiments of the enhanced call handling application providing operation to facilitate placing of the call via an alternative network (e.g., IP network) facilitates call completion despite the obstacles typically preventing third party applications from such operation.

As previously mentioned, a service provider, user, or other entity may identify one or more supplemental numbers, in addition to or in the alternative to identified emergency dispatch numbers, for which enhanced call handling is to be provided. Such supplemental numbers, although perhaps not protected by the device operating system and/or native calling application from call interception by an alternative calling application, may nevertheless be provided enhanced call handling according to embodiments herein. For example, if enhanced call handling application 160 detects a call attempt to a supplemental number by native calling application 150, enhanced call handling application 160 may allow native calling application 150 to proceed to attempt the call over the cellular network. Alternatively, enhanced call handling application 160 of embodiments may intercept the call attempt for enhanced call handling. For example, enhanced call handling application 160 may immediately attempt to initiate the call using the cellular network upon intercepting the call attempt. Alternatively, enhanced call handling application 160 may determine if cellular network connectivity is available/satisfactory before initiating the call attempt using the cellular network. If enhanced call handling application 160 initially makes the call attempt using the cellular network, embodiments of enhanced call handling application 160 operates to determine if cellular network connectivity is available/satisfactory. If it is determined that cellular network connectivity is not available or is otherwise unsatisfactory, whether after initiating a call attempt using the cellular network or prior to initiating such a call attempt, enhanced call handling application 160 of embodiments immediately initiates the call attempt using an alternative network, if available.

Numbers for which enhanced call handling is provided according to embodiments herein include numbers wherein location information for UE 110 is to be reported or is otherwise used. For example, calls placed to an emergency dispatch number are often expected or required to be accompanied by location information. Various devices often operate with base stations of a cellular network to determine a present location of the device. However, enhanced call handling provided by embodiments herein initiates calls when connectivity to such cellular networks is unavailable or unsatisfactory, and thus such location information may not be readily available or available in the typical way. Where enhanced call handling application 160 of embodiments completes a call using an alternative network, location information for UE 110 may be provided using or based upon the cellular network cell ID (e.g., macro cell ID where sufficient connectivity is available to obtain the cell ID), cached cellular network cell ID (e.g., the last reported macro cell ID prior to loss of cellular connectivity, perhaps subject to a staleness time threshold), location services location report (e.g., GOOGLE location services report of latitude and longitude), etc. The use of such sources for location information may be according to a predetermined priority, such as to use currently reported cell ID information prior to using cached cell ID information prior to using location services report information.

Although the foregoing examples have been described with reference to one alternative network, it should be appreciated that the concepts herein are applicable to situations in which a device has availability to multiple alternative networks. In such embodiments, a hierarchy of alternative networks may be established, such as by storing alternative network hierarchical information in a database of or available to special number call handling 163, for selection of a particular alternative network for initiating a call by enhanced call handling operation. Additionally or alternatively, a determination may be made regarding a particular alternative network to be used for the call, such as by logic of special number call handling 163 analyzing link quality information and/or other information for the available alternative networks and selecting an alternative network determined to be a best or most desirable (e.g., most likely to facilitate call completion and/or satisfactory communications) for the call. Embodiments may operate to utilize multiple such alternative networks with respect to a same call attempt. For example, upon enhanced call handling processing initiating a call attempt using a selected alternative network at block 204 of flow 200, processing may return to block 203 where a determination is made as to whether the call attempt made using the alternative network is successful or otherwise satisfactory, wherein processing may again return to block 204 for initiating enhanced calling functionality with respect to a different alternative network when the call attempt is not successful or satisfactory.

Embodiments of enhanced call handling application 160 have been described above with reference to operation as an alternative calling application monitoring the calling functionality of native calling application 150. However, it should be appreciated that enhanced call handling provided in accordance with the concepts herein is not limited to use with respect to such native calling applications. For example, enhanced call handling application 160 of embodiments may operate to monitor one or more third party applications (e.g., VoIP applications, SMS applications, email applications, etc.) to provide enhanced call handling for special called numbers with respect there to. In operation of such embodiments, an alternative network utilized in enhanced call handling attempts to facilitate the call may include, for example, a cellular network (e.g., the primary network utilized by native calling application 150 in the above example). Moreover, it should be appreciated that enhanced call handling provided according to embodiments herein need not be with respect to an alternative calling application monitoring the calling functionality of a native calling application. For example, an enhanced call handling application may be provided as a standalone calling application, such as a separate emergency dialer application (e.g., bundled with a VoIP client). In such an embodiment, an enhanced call handling dial launcher icon may be added, such as during client installation, whereby the user selects the launcher icon to place a call to a number (e.g., emergency number) for which enhanced call handling is to be provided. Thereafter, the enhanced call handling application may immediately attempt to initiate the call using the cellular network upon intercepting the call attempt. Alternatively, the enhanced call handling application may determine if cellular network connectivity is available/satisfactory before initiating the call attempt using the cellular network. If the enhanced call handling application initially makes the call attempt using the cellular network, embodiments of the enhanced call handling application operates to determine if cellular network connectivity is available/satisfactory. If it is determined that cellular network connectivity is not available or is otherwise unsatisfactory, whether after initiating a call attempt using the cellular network or prior to initiating such a call attempt, the enhanced call handling application of embodiments immediately initiates the call attempt using an alternative network, if available.

It should be appreciated that, although embodiments have been described herein with reference to called or dialed telephone numbers, the concepts herein are not limited to use with respect to such numbers. For example, embodiments may be utilized with respect to communications of various forms to one or more destination, such as data messages directed to one or more addresses (e.g., data packets directed to media access control (MAC) addresses, IP addresses, etc.), messages directed to one or more addresses (e.g., requests to one or more uniform resource locators (URLs), emails to one or more email address, etc.), and the like. Such numbers and addresses used with respect to communication initiation attempts are collectively referred to herein as communication destination identifiers.

Figure 4:
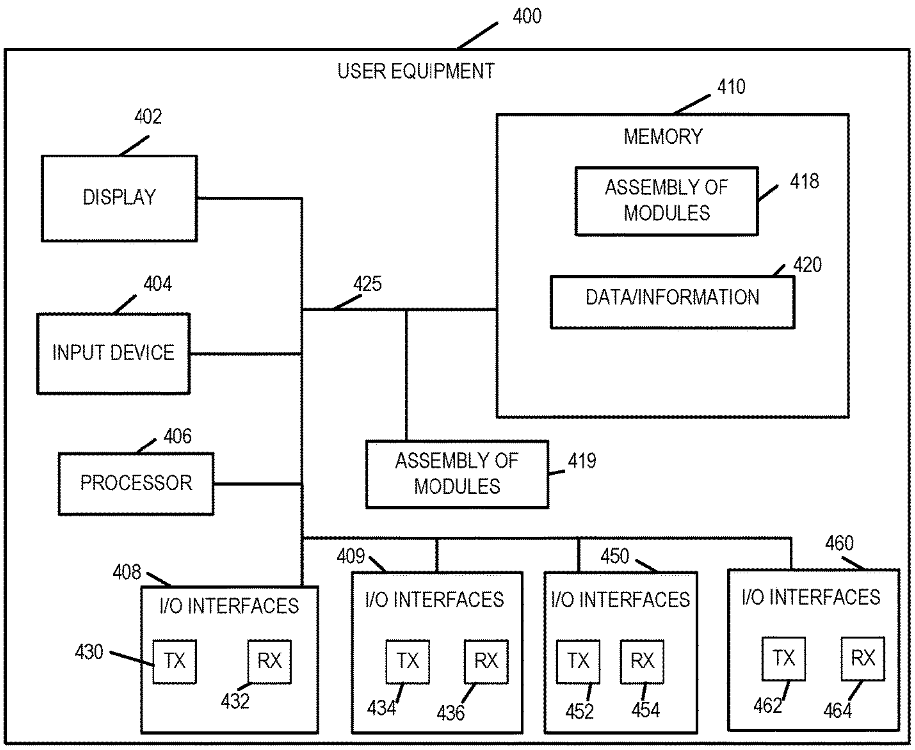
FIG. 4 shows an exemplary user equipment device in accordance with one embodiment of the present invention.

FIG. 4 illustrates an exemplary embodiment of a user equipment device 400 in accordance with the present invention. Exemplary user equipment device 400 includes a display 402, an input device 404, a processor 406, e.g., a CPU, input/output (I/O) interfaces 408, 409, 450, 460, which couple the user equipment device to networks and/or various other devices including for example base stations and access points, memory 410, and an assembly of modules 419, e.g., circuits corresponding to different modules, coupled together via a bus 425 over which the various elements may exchange data and information. Memory 410 includes an assembly of modules 418, e.g., an assembly of software modules, data/information 420. The I/O interfaces 408 include transmitters 430 and receivers 432. The I/O interfaces 409 include transmitters 434 and receivers 436. The I/O interfaces 450 include transmitters 452 and receivers 454. The I/O interfaces 460 include transmitters 462 and receivers 464. The user equipment device 400 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Transport Protocol packets of a media session.

The I/O interfaces and transmitters and receivers included therein in some embodiments are configured to communicate in accordance with cellular network protocol, the Internet Protocol, Transport Control Protocol (TCP), User Datagram Protocol (UDP), Session Initiation Protocol (SIP), Session Description Protocol (SDP). In some embodiments, the user equipment device 400 includes a communication module configured to operate using one or more cellular, IP, TCP, UDP, SIP, and SDP protocols. In some embodiments, the communication module is a hardware module, a software module or a module including hardware and software components.

In some embodiments, the exemplary user equipment 110 illustrated in FIG. 1 is implemented in accordance with description of the user equipment device 400 illustrated in FIG. 4. In some such embodiments, the native calling application 150, contacts 151, dialer 152, enhanced call handling application 160, dialer intercept 161, dialer 162 and special number call handling 163 are implemented as software modules in the assembly of modules 418 in memory 410. In some embodiments, the cellular network radio interface 130 and IP network radio interface 140 are each implemented as one of the I/O Interfaces 408, 409, 450 and 460. In some embodiments, the SIM 120 is implemented as one of the assembly of modules 419 of the user equipment device 400.

Figure 5A:
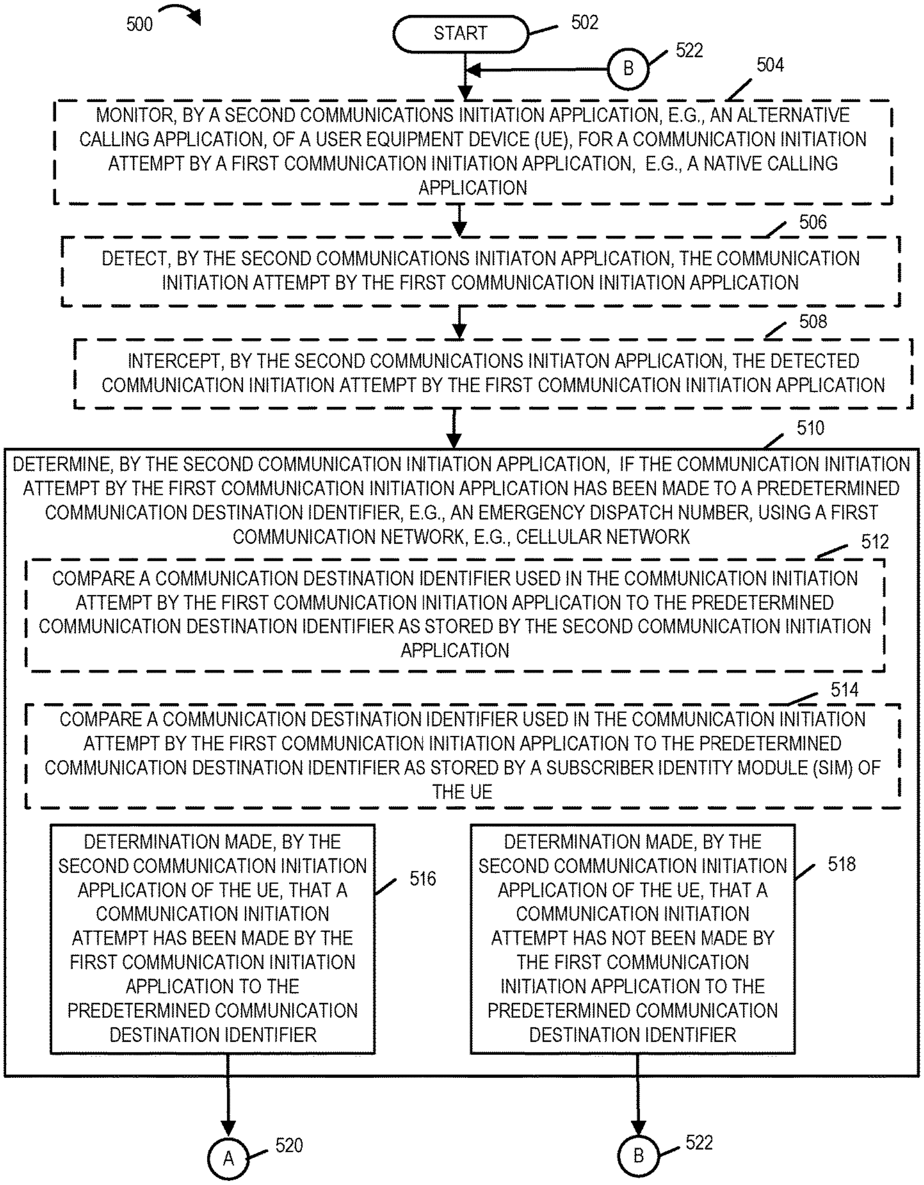
FIG. 5A shows the first part of a flow diagram in accordance with an exemplary embodiment of the present invention.
Figure 5B:
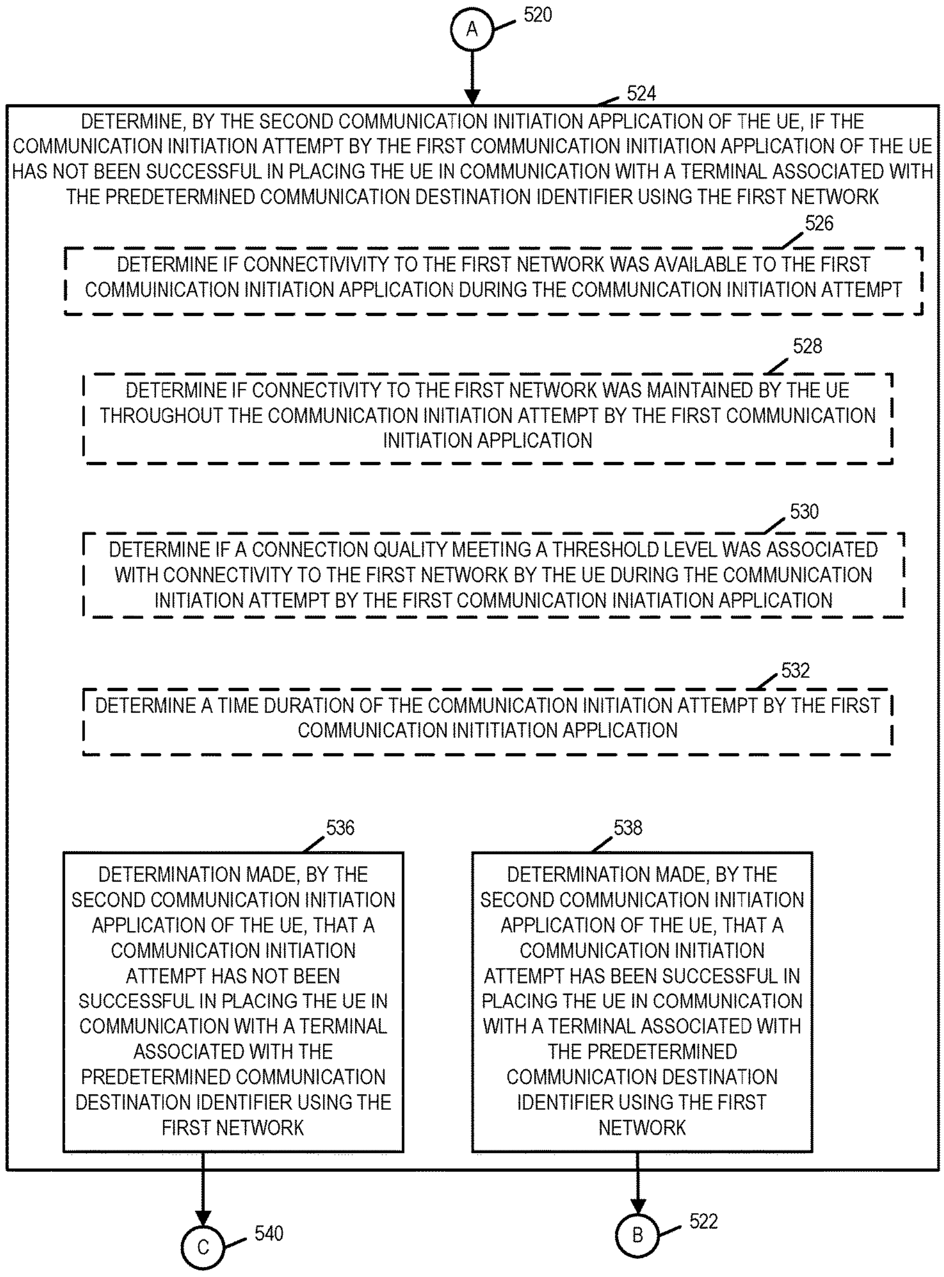
FIG. 5B shows the second part of a flow diagram in accordance with an exemplary embodiment of the present invention.
Figure 5C:
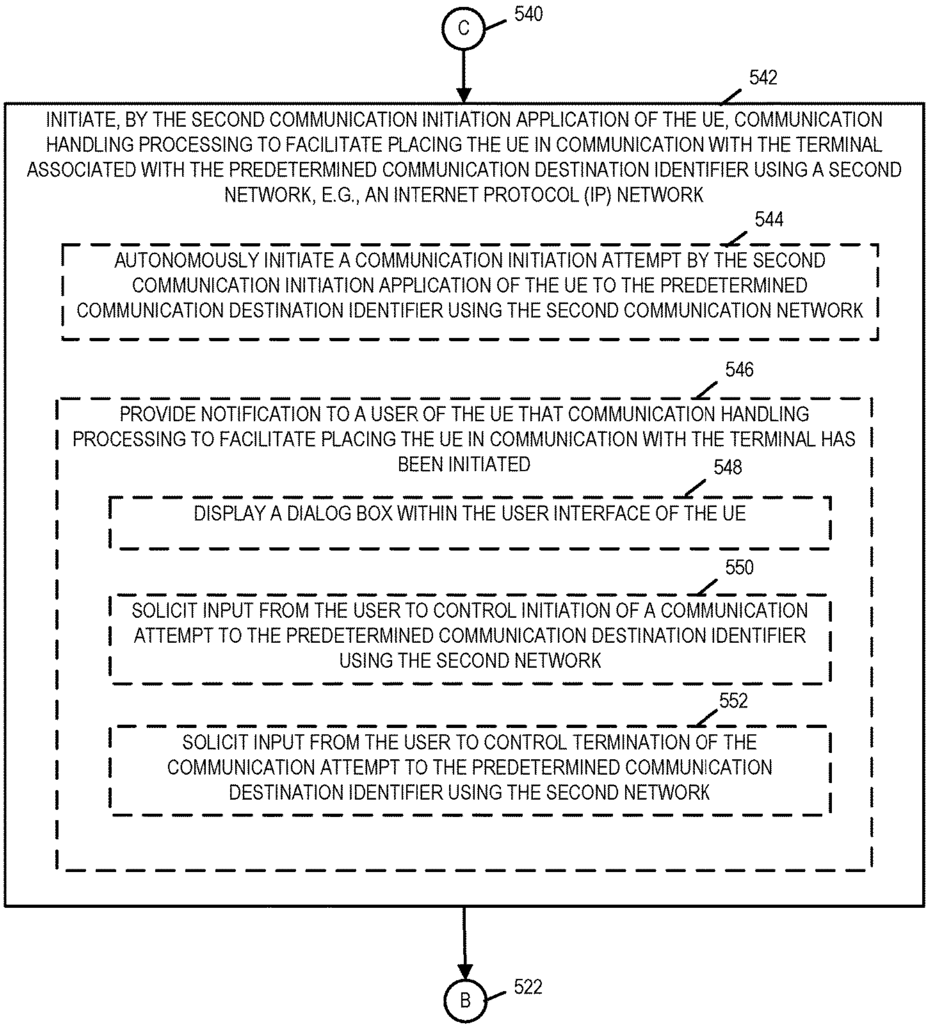
FIG. 5C shows the third part of a flow diagram in accordance with an exemplary embodiment of the present invention.
Figure 5:
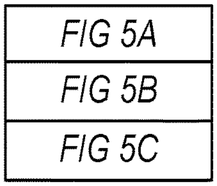
FIG. 5 shows the combination of FIGS. 5A, 5B, and 5C.

FIG. 5 illustrates a flow diagram of an exemplary method 500 in accordance with an embodiment of the present invention. FIG. 5 includes the combination of FIGS. 5A, 5B, and 5C. FIG. 5A illustrates the first part of the flow diagram of the method 500 of FIG. 5. FIG. 5B illustrates the second part of the flow diagram of the method 500 of FIG. 5. FIG. 5C illustrates the third part of the flow diagram of the method 500 of FIG. 5.

The method 500 may be, and in some embodiments is, implemented, using the communications system 100 illustrated in FIG. 1. In some embodiments, the steps of method 500 are performed by the UE 110 which may be implemented in accordance with the communications device (UE) 400 of FIG. 4.

Method 500 shown on FIG. 5A begins in start step 502 where operation proceeds from step 502 to step 504.

In step 504, a second communications initiation application, e.g., an alternative calling application, of a user equipment device (UE) monitors for a communication initiation attempt by a first communication initiation application, e.g., a native calling application. Operation proceeds from step 504 to step 506.

In step 506, the second communications initiation application detects the communication attempt by the first communication initiation application. Operation proceeds from step 506 to step 508.

In step 508, the second communications initiation application intercepts the detected communication initiation attempt by the first communication initiation application. Operation proceeds from step 508 to step 510.

In step 510, the second communication initiation application determines if the communication initiation attempt by the first communication initiation application has been made to a predetermined communication destination identifier, e.g., an emergency dispatch number, using a first communication network, e.g., a cellular network. In some embodiments, step 510 includes optional sub-steps 512 and 514 along with sub-steps 516 and 518.

In optional sub-step 512, the second communication initiation application compares a communication destination identifier used in the communication initiation attempt by the first communication initiation application to the predetermined communication destination identifier as stored by the second communication initiation application, e.g., in data/information 420 of memory 410 and/or in a database. If the comparison results in a match then operation proceeds to sub-step 516. If the comparison doesn't result in a match and there are more than one stored predetermined communication destination identifiers than each of the remaining stored predetermined communication destination identifiers are compared to the communication destination identifier used in the communication initiation attempt. When there is a match then operation proceeds to step 516 otherwise processing proceeds to optional sub-step 514. If optional sub-step 514 is not implemented and there is no match then operation proceeds to sub-step 518.

In sub-step 514, the second communication initiation application compares the communication destination identifier used in the communication initiation attempt by the first communication initiation application to the predetermined communication destination identifier as stored by a subscriber identity module (SIM) of the UE. If the comparison results in a match then operation proceeds to sub-step 516. If the comparison doesn't result in a match and there are more than one predetermined communication destination identifiers stored than each of the remaining stored predetermined communication destination identifiers are compared to the communication destination identifier used in the communication initiation attempt. When there is a match then operation proceeds to step 516 otherwise processing proceeds to optional sub-step 518. The order in which optional sub-steps 512 and 514 are performed may be reversed.

In sub-step 516, the second communication initiation application of the UE makes a determination that the communication initiation attempt made by the first communication initiation application was to the predetermined communication destination identifier(s). Operation proceeds from sub-step 516 of step 510 via connection node A 520 to step 524 shown on FIG. 5B.

In sub-step 518, the second communication initiation application of the UE makes a determination that the communication initiation attempt made by the first communication initiation application was not to the predetermined communication identifier(s). Operation proceeds from sub-step 518 of step 510 via connection node B 522 to monitoring step 504 where processing continues as previously described. It should be noted that monitoring, may be, and in most embodiments is, continuously performed even after the detection of a communication initiation attempt.

In step 524, the second communication initiation application of the UE determines if the communication initiation attempt by the first communication initiation application of the UE has not been successful in placing the UE in communication with a terminal associated with the predetermined communication destination identifier using the first network. Step 524 includes sub-steps 536 and 538 and optional sub-steps 526, 528, 530, and 532. In some embodiments, the method 500 includes at least one of the optional sub-steps 526, 528, 530, 532. In sub-step 526, the second communication application of the UE determines if connectivity to the first network was available to the first communication initiation application during the communication initiation attempt. If connectivity was not available then operation proceeds from sub-step 526 to sub-step 536. If connectivity was available operation proceeds to optional sub-step 528. If optional sub-step 528 is not implemented then operation proceeds to optional sub-step 530. If optional sub-step 530 is not implemented then operation proceeds to optional sub-step 532. If optional sub-step 532 is not implemented then operation proceeds to sub-step 538.

In sub-step 528, the second communication application of the UE determines if connectivity to the first network was maintained by the UE throughout the communication initiation attempt by the first communication application. If connectivity was not maintained throughout the communication initiation attempt by the first communication initiation application then operation proceeds from sub-step 528 to sub-step 536. If connectivity was maintained operation proceeds from sub-step 528 to optional sub-step 530. If optional sub-step 530 is not implemented then operation proceeds to sub-step 532. If optional sub-step 532 is not implemented then operation proceeds to sub-step 538.

In sub-step 530, the second communication initiation application determines if a connection quality meeting a threshold level was associated with connectivity to the first network by the UE during the communication initiation attempt by the first communication initiation application. If it is determined that the connection quality did not meet the threshold level then operation proceeds from sub-step 530 to sub-step 536. If the connectivity quality threshold level was met operation proceeds from sub-step 530 to optional sub-step 532. If optional sub-step 532 is not implemented then operation proceeds to sub-step 538.

In sub-step 532, the second communication initiation application determines a time duration of the communication initiation attempt by the first communication initiation application. If the time duration is less than a predetermined time value then operation proceeds from sub-step 532 to sub-step 536. Otherwise, operation proceeds from sub-step 532 to sub-step 538.

In sub-step 536 of step 524, a determination is made by the second communication initiation application of the UE that the communication initiation attempt has not been successful in placing the UE in communication with a terminal associated with the predetermined communication destination identifier using the first network. Operation proceeds from sub-step 536 of step 524 via connection node 3 540 to step 542 illustrated on FIG. 5C.

In sub-step 538 of step 524, a determination is made by the second communication initiation application of the UE that the communication initiation attempt has been successful in placing the UE in communication with a terminal associated with the predetermined communication destination identifier using the first network. Operation proceeds from sub-step 538 of step 524 via connection node B 522 to monitoring step 504 where operation of method 500 proceeds as previously described.

In step 542, the second communication initiation application of the UE initiates communication handling processing to facilitate placing the UE in communication with the terminal associated with the predetermined communication destination identifier using a second network, e.g., an Internet Protocol (IP) network. In some embodiments step 542 includes one or more of the optional sub-steps 544 and 546.

In optional sub-step 544, the second communication initiation application autonomously initiates a communication initiation attempt by the second communication initiation application of the UE to the predetermined communication destination identifier using the second communication network. In some embodiments the second communication initiation application only autonomously initiates a communication initiation attempt after a fixed number of multiple initiation attempts to the predetermined communication destination identifier using the first communication network have failed within a predetermine time period. E.g., two failed attempts within a time minute time period.

In optional sub-step 546, the second communication initiation application provides notification to a user of the UE that communication handling processing to facilitate placing the UE in communication with the terminal has been initiated. In some embodiments sub-step 546 includes one or more optional sub-steps 548, 550, and/or 552.

In sub-step 548, a dialog box within the user interface of the UE is displayed.

In sub-step 550, input is solicited from the user of the UE to control initiation of a communication attempt to the predetermined communication destination identifier using the second network.

In sub-step 552, input is solicited from the user of the UE to control termination of the communication attempt to the predetermined communication destination identifier using the second network.

Operation proceeds from step 542 to monitoring step 504 shown on FIG. 5B via connection node B 522 where operation proceeds as previously described.

In some embodiments, the predetermined communication destination identifier comprises an emergency dispatch number for which the UE operates to prevent the alternative calling application from intercepting communication initiation attempts made by the native calling application. In some such embodiments, the interception of the call attempt is a monitoring process whereby the second communications initiation application monitors call initiation attempts by the first communications initiation applications, e.g., native calling application, and identifies those attempts to the predetermined destination identifier, e.g., an emergency dispatch number, without affecting or interrupting the call initiation attempt. The second communications initiation application, e.g., an enhanced call handling application, then operates to make one or more subsequent call attempts to the emergency dispatch number via alternative communications path(s) if the native calling application initiation attempt(s) are determined by the enhanced call handling application to have failed.

In some embodiments of the method 500, the second communication initiation application comprises a native calling application and the native calling application provides calling services with respect to one or more cellular networks, the first cellular network being one of such cellular networks. In some such embodiments, the second communication initiation application comprises an alternative calling application that provides calling services with respect to one or more alternative networks, e.g., IP networks, to the one or more cellular networks. In some of these embodiments in step 524, when the alternative calling application of the UE determines that a communication initiation attempt has not been successful in placing the UE in communication with a terminal in association with the predetermined communication destination identifier using the first network, the alternative calling application displays a notification soliciting input from the user of the UE to control initiation of a call initiation attempt to the predetermined emergency dispatch number using an alternative network of the one or more alternative networks. In some embodiments in place of or in addition to displaying a notification to the UE, an audio notification is provided to the user soliciting input from the user of the UE to control initiation of a call initiation attempt to the predetermined emergency dispatch number using an alternative network of the one or more alternative networks. In some embodiments, displaying of the notification to the user includes soliciting input from the user to control termination of the call initiation attempt by the native calling application of the UE. In some embodiments, an audio notification may be used instead of or in addition to the display notification.

In some embodiments, each step of the method 500 is implemented as instructions executed by a processor. In some embodiments, each step is executed by a separate processor in the UE. In some embodiments, the first and/or second communications initiation applications are implemented as software executed on one or more processors. In some embodiments, the first and/or second communications initiation applications are implemented as hardware modules, e.g., circuitry. In some embodiments, the communication initiation applications are implemented as a combination of hardware (e.g., circuits) and software.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. It is to be understood that the term logic in the application refers to software, hardware (e.g., circuits) and/or a combination of software and hardware.

The techniques of various embodiments may be implemented using software, hardware (e.g., circuitry) and/or a combination of software and hardware. Various embodiments are directed to apparatus, e.g., a user equipment device such as a mobile phone, smartphone, laptop, etc. Various embodiments are also directed to methods, e.g., a method of operating a communications device such as a mobile phone, smartphone, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments applications described herein are implemented using one or more modules to perform the steps corresponding to one or more methods, for example, determining if a communication initiation attempt has been made to a predetermined communication destination identifier using a first communication network, determining if a UE has not been successful in placing the UE in communication with a terminal associated with the communication destination identifier using a first network, initiating communication handling processing to facilitate placing a UE in communication with the terminal associated with the communication destination identifier using a second network, signal transmission, signal reception, signal processing, and/or other steps. Thus, in some embodiments various features are implemented using modules. Such modules may be implemented using software, hardware (e.g., circuitry) or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a mobile phone, smartphone, laptop, etc., including a processor configured to implement one, multiple or all of the steps of one or more methods of the invention.

In some embodiments, the processor or processors, e.g., CPUs, of one or more devices, e.g., of the communications device, e.g., a mobile phone, smartphone, etc., are configured to perform the steps of the methods described as being performed by the apparatus or to control the apparatus to perform the steps. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a mobile phone, smartphone, etc., with a processor which includes a module corresponding to each of the steps of the various described methods performed by the device in which the processor is included. In some, but not all embodiments, an apparatus, e.g., a communications device, e.g., a mobile phone, smartphone, mobile phone, etc., includes a module corresponding to each of the steps of the various described methods performed by the device in which the processor is included. The modules may be implemented using software and/or hardware (e.g., circuitry).

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a mobile phone, smartphone, etc. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method comprising:

determining, by a second communication initiation application of a user equipment (UE), if a communication initiation attempt by a first communication initiation application of the UE has been made to a predetermined communication destination identifier using a first communication network;

determining, by the second communication initiation application of the UE if it is determined that a communication initiation attempt has been made by the first communication initiation application to the predetermined communication destination identifier, if the communication initiation attempt by the first communication initiation application of the UE has not been successful in placing the UE in communication with a terminal associated with the predetermined communication destination identifier using the first network; and initiating, by the second communication initiation application of the UE if it is determined that a communication initiation attempt has been made by the first communication initiation application to the predetermined communication destination identifier and if it is determined that the communication initiation attempt has not been successful in placing the UE in communication with the terminal, communication handling processing to facilitate placing the UE in communication with the terminal associated with the predetermined communication destination identifier using a second network.

2. The method of claim 1, wherein the first communication initiation application comprises a native calling application and the first network comprises a cellular network, wherein the second communication initiation application comprises an alternative calling application and the second network comprises an Internet protocol (IP) network, and wherein the alternative calling application is operable to monitor and intercept communication initiation attempts made by the native calling application.

3. The method of claim 2, wherein the predetermined communication destination identifier comprises an emergency dispatch number for which the UE operates to prevent the alternative calling application from intercepting communication initiation attempts made by the native calling application.

4. The method of claim 1, wherein the determining if a communication initiation attempt has been made to the predetermined communication destination identifier comprises:

comparing a communication destination identifier used in the communication initiation attempt by the first communication initiation application to the predetermined communication destination identifier as stored by the second communication initiation application.

5. The method of claim 1, wherein the determining if a communication initiation attempt has been made to the predetermined communication destination identifier comprises:

comparing a communication destination identifier used in the communication initiation attempt by the first communication initiation application to the predetermined communication destination identifier as stored by a subscriber identity module (SIM) of the UE.

6. The method of claim 1, wherein the determining if the communication initiation attempt by the first communication initiation application has not been successful comprises:

determining if connectivity to the first network was available to the first communication initiation application during the communication initiation attempt.

7. The method of claim 1, wherein the determining if the communication initiation attempt by the first communication initiation application has not been successful comprises:

determining a time duration of the communication initiation attempt by the first communication initiation application.

8. The method of claim 1, wherein the initiating communication handling processing to facilitate placing the UE in communication with the terminal using the second network comprises:

providing notification to a user of the UE that communication handling processing to facilitate placing the UE in communication with the terminal has been initiated.

9. The method of claim 8, wherein the providing notification to the user comprises:

displaying a dialog box within a user interface of the UE.

10. The method of claim 8, wherein the providing notification to the user comprises:

soliciting input from the user to control initiation of a communication attempt to the predetermined communication destination identifier using the second network.

11. A system comprising:

dialer intercept logic adapted to monitor communication initiation attempts by a first communication initiation application of a user equipment (UE); and communication handling logic adapted to determine if a communication initiation attempt by the first communication initiation application using a first communication network has been made to a predetermined communication destination identifier, to determine if the communication initiation attempt by the first communication initiation application has not been successful in placing the UE in communication with a terminal associated with the communication destination identifier using the first network, and to initiate communication handling processing to facilitate placing the UE in communication with the terminal associated with the communication destination identifier using a second network.

12. The system of claim 11, wherein the first communication initiation application comprises a native calling application and the first network comprises a cellular network, wherein the dialer intercept logic and the communication handling logic comprise an alternative calling application and the second network comprises an Internet protocol (IP) network, and wherein the alternative calling application is adapted to monitor and intercept communication initiation attempts made by the native calling application.

13. The system of claim 12, wherein the predetermined communication destination identifier comprises an emergency dispatch number for which the UE operates to prevent the alternative calling application from intercepting communication initiation attempts made by the native calling application.

14. The system of claim 11, wherein the communication handling logic is further adapted to compare a communication destination identifier used in the communication initiation attempt by the first communication initiation application to the predetermined communication destination identifier to determine if the communication initiation attempt has been made to the predetermined communication destination identifier.

15. The system of claim 11, wherein the communication handling logic is further adapted to compare a communication destination identifier used in the communication initiation attempt by the first communication initiation application to the predetermined communication destination identifier as stored by a subscriber identity module (SIM) of the UE to determine if the communication initiation attempt has been made to the predetermined communication destination identifier.

16. The system of claim 11, wherein the communication handling logic is further adapted to determine if connectivity to the first network was available to the first communication initiation application during the communication initiation attempt to determine if the communication initiation attempt by the first communication initiation application has not been successful.

17. The system of claim 11, wherein the communication handling logic is further adapted to determine a time duration of the communication initiation attempt by the first communication initiation application to determine if the communication initiation attempt by the first communication initiation application has not been successful.

18. The system of claim 11, wherein the communication handling logic is further adapted to provide notification to a user of the UE that communication handling processing by the communication handling logic to initiate communication handling processing to facilitate placing the UE in communication with the terminal using the second network.

19. A method for facilitating completion of emergency dispatch calls, the method comprising:

monitoring, by an alternative calling application of a user equipment (UE), call initiation attempts by a native calling application of the UE, wherein native calling application provides calling services with respect to one or more cellular networks and the alternative calling application provides calling services with respect to one or more alternative networks to the one or more cellular networks;

determining, by the alternative calling application of the UE, if a call initiation attempt of the monitored call initiation attempts has been made to a predetermined emergency dispatch number using a cellular network of the one or more cellular networks;

determining, by the alternative calling application of the UE, if the call initiation attempt by the native calling application of the UE to the predetermined emergency dispatch number has not been successful in placing the UE in communication with a terminal associated with the predetermined emergency dispatch number using the cellular network; and controlling, by the alternative calling application of the UE if it is determined that the call initiation attempt has been made by the native calling application to the predetermined emergency dispatch number and if it is determined that the call initiation attempt has not been successful in placing the UE in communication with the terminal, display of a notification soliciting input from a user of the UE to control initiation of a call initiation attempt to the predetermined emergency dispatch number using an alternative network of the one or more alternative networks.

20. The method of claim 19, wherein the one or more alternative networks comprise Internet protocol (IP) networks.

* * * * *